(12) United States Patent
Appala et al.

(10) Patent No.: US 11,374,980 B1
(45) Date of Patent: Jun. 28, 2022

(54) RESOLUTION OF POLICY ENFORCEMENT POINT BY CROSS CORRELATING OTHER POLICIES

(71) Applicant: Cisco Technology, Inc., San Jose, CA (US)

(72) Inventors: Syam Sundar V Appala, Santa Clara, CA (US); Rex Emmanuel Fernando, Fremont, CA (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 56 days.

(21) Appl. No.: 16/746,167

(22) Filed: Jan. 17, 2020

(51) Int. Cl.
*H04L 9/40* (2022.01)
*H04L 41/0893* (2022.01)
*H04L 41/12* (2022.01)

(52) U.S. Cl.
CPC .......... *H04L 63/20* (2013.01); *H04L 41/0893* (2013.01); *H04L 41/12* (2013.01); *H04L 63/0876* (2013.01)

(58) Field of Classification Search
CPC ..... H04L 63/20; H04L 41/12; H04L 41/0893; H04L 63/0876
See application file for complete search history.

(56) References Cited

U.S. PATENT DOCUMENTS

| 9,467,393 | B2 | 10/2016 | Cimprich et al. |
| 10,862,796 | B1* | 12/2020 | Dickinson ........... H04L 63/1408 |
| 2005/0283822 | A1* | 12/2005 | Appleby ................ G06Q 30/00 726/1 |
| 2012/0023546 | A1 | 1/2012 | Kartha et al. |
| 2013/0174218 | A1* | 7/2013 | Sasaki .................. H04L 63/102 726/1 |
| 2016/0210578 | A1* | 7/2016 | Raleigh ............ G06Q 10/06375 |
| 2017/0317976 | A1* | 11/2017 | Chalvadi ................ H04L 47/32 |
| 2019/0260641 | A1* | 8/2019 | Giust .................... H04L 67/141 |
| 2021/0055933 | A1* | 2/2021 | Bulut .................... G06F 9/3838 |

FOREIGN PATENT DOCUMENTS

| WO | 2014022755 A3 | 2/2014 |
| WO | 2016072996 A1 | 5/2016 |

* cited by examiner

*Primary Examiner* — Tonia L Dollinger
*Assistant Examiner* — Joseph M Cousins
(74) *Attorney, Agent, or Firm* — Edell, Shapiro & Finnan, LLC

(57) ABSTRACT

A plurality of policies to be enforced in a network environment via a plurality of devices are determined. A topology of the plurality of devices within the network environment is also determined. For each policy of the plurality of policies, a device of the plurality of devices is selected as the location at which to enforce the policy of the plurality of policies. Selecting the device for each policy of the plurality of policies includes correlating the policy of the plurality of policies with another of the plurality of policies and correlating the policy of the plurality of policies with the topology.

20 Claims, 6 Drawing Sheets

RESOLUTION OF POLICY ENFORCEMENT POINT BY CROSS CORRELATING OTHER POLICIES

TECHNICAL FIELD

The present disclosure relates to enforcement of policies in network environments, and in particular, the determination of enforcement points for policies in network environments.

BACKGROUND

Current network environments are constructed from a complex arrangement of network devices, often times arranged in a plurality of network domains. The devices that make-up the network environments may be configured to implement or enforce network policies. Network policy enforcement is the application of network access control mechanisms to control access to a network. The criteria for whether and how an end system is allowed to access the network are specified in a set of rules or parameters known as a "policy." A policy is either a set of usage rules, a set of parameters to be used by a specific authorized user, or a set of system criteria that is used to precisely define the rules that must be complied with before the system is allowed to access the network or how the system's traffic is treated within the network.

Different devices within the network infrastructure may be better suited to enforce specific policies. The appropriateness of a network device for enforcement of a particular policy may be dictated by the capabilities of the network device, the configuration of the network device, the location of the network device within the network environment, or other considerations known to the skilled artisan.

DESCRIPTION OF EXAMPLE EMBODIMENTS

Overview

Figure 1:
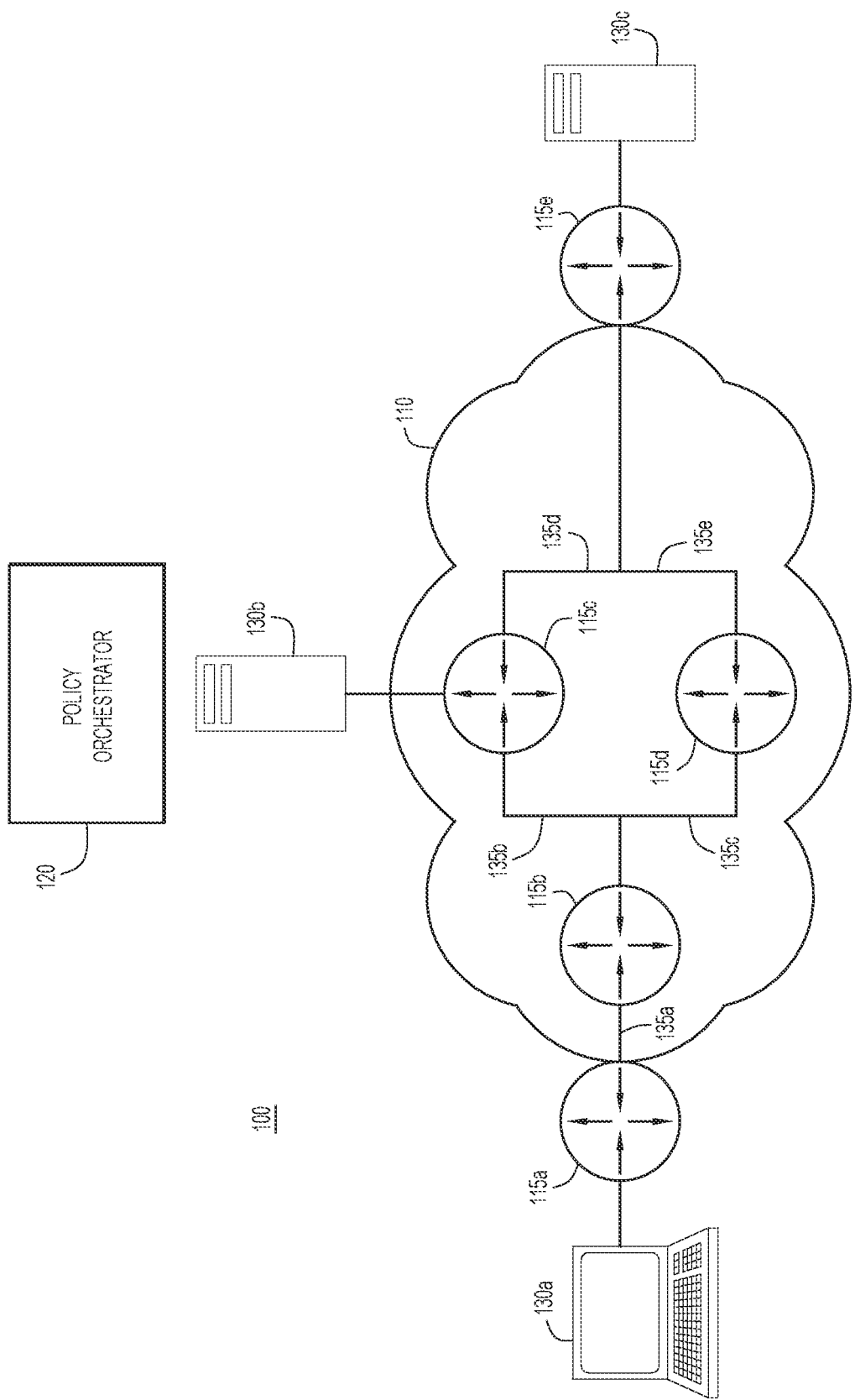
FIG. 1 is a network environment configured to implement the policy enforcement point resolution techniques of the present disclosure, according to an example embodiment.

A plurality of policies to be enforced in a network environment via a plurality of devices are determined. A topology of the plurality of devices within the network environment is also determined. For each policy of the plurality of policies, a device of the plurality of devices is selected as the location at which to enforce the policy of the plurality of policies. Selecting the device for each policy of the plurality of policies includes correlating the policy of the plurality of policies with another of the plurality of policies and correlating the policy of the plurality of policies with the topology.

EXAMPLE EMBODIMENTS

According to the techniques of the present disclosure, the locations or network devices where network policies are implemented or enforced (i.e., "enforcement points") are determined in order to, for example, optimize the enforcement of policies within the network. This optimization may take the form of, for example, minimizing network traffic, optimizing network resource usage, and/or minimizing the traversal that the packet has to flow from source devices to destination devices. In making the decision as to where a policy is to be implemented or enforced, considerations such as the network topology, including the policy implementation or enforcement capabilities of network devices and their locations, may be considered. According to other examples, the optimization provided by the techniques of the present disclosure may include determining an optimal enforcement point to intercept network traffic for policy enforcement. The effect of a particular network policy on other network policies may also be considered. Therefore, according to the techniques of the present disclosure, determinations as to where a network policy is to be implemented or enforced may be made by cross correlating the network policy with other network policies and/or the network topology. The techniques of the present disclosure determine enforcement points for network security, quality-of-service (QoS), quality-of-experience, path selection, and service chaining network services. Accordingly, when the present disclosure refers to "policies" or "network policies," the term is intended to cover execution of all of the above-described network services, as well as other services known to the skilled artisan. As will be explained in greater detail below, the network topology may be the topology of a single network domain or a plurality of network domains. According to specific example embodiments, the plurality of network domains and their capabilities may be managed by a domain controller with authority to manage the plurality of domains and their capabilities. As will also be described in greater detail below, the techniques of the present disclosure may be implemented via a policy orchestrator device.

Because enforcement points for policies are determined through cross correlation with network topology and other network policies, the techniques of the present disclosure may be leveraged to make enforcement location decisions for a variety of policy types in ways that optimize policy enforcement. What follows is a brief discussion of some example policies whose enforcement points may be determined according to the techniques of the present disclosure.

According to a first example network policy, all users of one type may be granted access to a particular data center. More specifically, all "engineering" users may be provided access to "collaboration applications" in the data center. If the "engineering" users access the data center from a plurality of locations, this policy may be implemented at the data center.

For example, if engineering users are located in three different campuses, as well as a large number of separate branches and remote access sites, this policy may be enforced at the data center based upon the network topology. In other words, a policy orchestrator device may consider placement in the network as the criteria used to determine where to render and enforce the policy. In the present example, because users are accessing the network from a large number of different locations, locating the enforcement point for the policy based upon network topology may result in the policy being implemented at the data center, as all traffic to which this policy applies would find its way to the data center.

Making a location decision based upon network resources may also result in the policy being implemented at the data center. In a network environment in which ternary content-addressable memory (TCAM) is being highly utilized, TCAM resources may be optimized by implementing this policy at a single location, and therefore, only one or a few network devices may need to designate TCAM resources to implement the policy. A policy that will receive traffic from numerous different locations, such as the above-described policy in which "engineering" users may be provided access to "collaboration applications" in the data center, enforcing this policy at the data center may preserve or optimize TCAM resources. Other resources that may be considered include the running state of the device, such as the central processing unit (CPU) capabilities and usage of the device, as well as other memory capabilities of the device.

According to a second example policy, engineering users are allowed access to "development servers" on "Port 443" using multiprotocol label switching (MPLS) for path selection with "gold" QoS guaranteed. The techniques of the present disclosure may translate this policy into micro segmentation policies (also referred to herein as "policy fragments") that may be enforced at different areas within a network environment. If the engineering users are distributed as described above, the techniques of the present disclosure may enforce a portion of the policy, the portion that provides access to the development servers, at the data center for reasons analogous to those provided above. The other portions of the policy, directed to the use of MPLS for path selection and providing "gold" QoS, may be implemented elsewhere. For example, these policies would be implemented at devices that provide for path selection and QoS capabilities. Path selection and QoS capabilities may be provided by software defined wide area networks (SD-WAN). Accordingly, the MPLS path selection and QoS portions of the policy may be implemented at the ingress device to the SDWAN domain of the network environment traversed by the traffic destined for the data center in which the development servers are arranged. The implementation of this policy may also include providing for MPLS path selection and QoS policy implementation at the appropriate point for the return traffic from the development servers to the engineering users. Accordingly, this policy may also be implemented at the ingress device of the SDWAN domain for traffic sent from the data center destined for the engineering users.

According to a third example policy, traffic from all remote access Virtual Private Network (VPN) users may be required to undergo Multi-Factor Authentication (MFA). Such a policy may be implemented at a device that is configured to provide an MFA enforcement capability. Therefore, this policy would be implemented at a device, such as a Duo Security Single Sign-On (SSO) server, with MFA enforcement capabilities.

According to a fourth example policy, all "guest" user traffic would be denied access to data center applications. Such a policy may be implemented at an ingress node to the network for a number of possible reasons. For example, to preserve network resources, denying the guest traffic as early as possible (e.g., closer to the source of the traffic) provides the most efficient use of network resources. Furthermore, such "deny" policies may not be achievable with Virtual Network (VN) connectivity. Accordingly, such a "deny" policy may be implemented at an ingress network node. On the other hand, another example policy may require that all traffic from jailbroken mobile phones be inspected and that the traffic also be denied. Such a policy may not be enforced at an ingress network node as an ingress network node may not be configured to or may not have the capability to perform the required inspection. Therefore, denying such traffic at an ingress network node would fail to appropriately implement the policy. In order for such a policy to be correctly implemented, traffic from jailbroken mobile devices would be permitted to traverse the network until it reaches a security controller or another device capable of and configured to perform the required inspection. Once the inspection is performed, the traffic may be denied.

With reference now made to FIG. 1, depicted therein is an example network environment 100 configured to implement the techniques of the present disclosure. Included in network environment 100 is a network domain 110 in which a plurality of devices, such as switches and routers, are configured to route traffic and implement network policies. Also included in network environment 100 is a policy orchestrator 120. Policy orchestrator 120 is configured to author and orchestrate network policies across an enterprise. Policy orchestrator 120 may provide its policy authoring and orchestrating techniques for a single network domain, such as network domain 110, or it may provide policy authoring and orchestrating functionality in a multi-domain enterprise, as described in greater detail below with reference to FIG. 2.

More specifically, policy orchestrator 120 resolves network policies, correlates within different sections of policies, correlates with network topology and device capabilities, and determines which of devices 115a-e should implement the policies in order to optimize the implementation of network policies. This optimization may take the form of, for example, minimizing network traffic, optimizing network resource usage, and/or minimizing the traversal that the packet has to flow from source devices to destination devices.

In order to optimize the implementation of network policies, policy orchestrator 120 is aware of the network topology of devices 115a-e. This network topology includes the relative location of devices 115a-e and the functionality that each of devices 115a-e are capable of and configured to perform. For example, policy orchestrator 120 may store data indicative of the topology of network domain 110. This data may indicate that network devices 115a, 115c and 115e are edge network devices through which endpoint devices 130a-c access network domain 110. The data stored at policy orchestrator 120 may also indicate the network links 135a-e that interconnect devices 115a-e. Accordingly, policy orchestrator 120 may be aware of the network paths though network domain 110. The data stored at policy orchestrator 120 may also indicate the functionality that each of devices 115a-e are capable of and configured to implement. For example, different ones of devices 115a-e may be configured to provide security functionality, such as packet inspection, and ensure QoS levels for traffic traversing network domain 110. The data stored at policy orchestrator 120 may also indicate the resources available at each of devices 115a-e, such as TCAM capacity and utilization. This data may also indicate the applications and user groups that access network domain 110 and via which of endpoint devices 130*a-c* this access takes places. This data allows policy orchestrator 120 to resolve network policies and correlate the network policies with other policies and the network topology to determine where within network domain 110 the policies are to be implemented. According to specific example embodiments, policy orchestrator 120 may break down a policy into fragments of services that are to be implemented or enforced. The resolution logic of policy orchestrator 120 looks at the network topology and determines the path traversal for the policy flow. Policy orchestrator 120 then determines the set of domains and devices involved in the traversal path, determines the capabilities and resource levels of the devices along the traversal path, and determines which portions of the policy may be enforced at which devices along the traversal path. A particular security policy may indicate that "all engineering users are allowed access to production or collaboration servers." The policy orchestrator 120 may determine that this access control security policy may be scalably enforced using a virtual networking network connectivity policy, preserving TCAM and network resources.

With this data, policy orchestrator 120 is configured to implement policies that optimize network resources, while ensuring policy consistency through cross correlation of policies and cross correlation of policies with network topology. Take, for example, a policy that indicates that traffic from a user "User 1" destined for an application "App 1" is to be copied to an intrusion prevention system "IPS1," and denied. Policy orchestrator 120 will store data indicating that "User 1" accesses network domain 110 via endpoint device 130*a*, "IPS1" accesses network domain 110 through endpoint device 130*b*, and that "App1" accesses network domain 110 through endpoint device 130*c*. In order to determine where to locate this policy, policy orchestrator 120 will first resolve the policy. For example, policy orchestrator 120 may resolve the policy by breaking the policy into a number of policy fragments, specifically:

Copy traffic from User 1 to App1 and send it to IPS1; and
Deny traffic from User 1 to App1.

Policy orchestrator 120 will them correlate these policy fragments (also referred to herein as "micro segmented policies") with each other and with the network topology to determine where each fragment should be implemented. According to specific example embodiments, the correlation techniques of the present disclosure may include:

1. Substitution of the policy with other policies or policy fragments that may substitute for the initial policy in a scalable way;
2. Correlation of the substituted policy fragments with other policy fragments to determine an order in which the policy fragments are to be enforced in order to achieve the intent of the policy;
3. Correlation of the substituted policy fragments with capabilities of network domains that the policy traverses; and
4. Correlation of the substituted policy fragments with network resources of the network domains that the policy traverses.

According to such specific example embodiments, policy orchestrator 120 may evaluate and cross correlate the policy fragments according to a predetermined order of priorities. First, policy orchestrator 120 may determine an order for the execution of the policies or policy fragments. As used herein, the order of the execution refers to the order along the path through the network domains that the traffic traverses. Second, policy orchestrator 120 may determine where the policy or policy fragments are to be enforced. With regard to the order of the execution of the policies or policy fragments, it is generally the case that inspection and logging policies may be evaluated first, copy and redirect policies may be evaluated second, access control policies may be evaluated third, and finally, path preference policies may be evaluated last. Once an order for execution of the policies or policy fragments is determined, the appropriate location, or the appropriate device, for enforcement of the policies or policy fragments may be determined. This determination of the appropriate device for enforcement takes into consideration the determined order of policy fragment enforcement, network device capabilities and network device resources.

For example, the location of enforcement for the policies or policy fragments may be determined in a particular order, with inspection and logging policies being evaluated, then copy and redirect policies being evaluated, then access control policies being evaluated, and finally, path preference policies being evaluated. The order in which each policy is cross correlated with the other policies and the topology may also be according to a predetermined order. For example, the policies or policy fragments may be cross-correlated first with resource availability network topology data to determine which devices are capable of and configured to implement the policy or policy fragment being evaluated. Then the policy or policy fragment may be cross correlated with inspection and logging policies to ensure that the enforcement location for the policy or policy fragment is appropriately ordered relative to the inspection and logging policies. Then the policy or policy fragment is cross correlated with copy and redirect policies to ensure that the enforcement location for the policy or policy fragment is appropriately ordered relative to the copy and redirect policies. Then the policy or policy fragment is cross correlated with access control policies to ensure that the enforcement location for the policy or policy fragment is appropriately ordered relative to the access control policies. Finally the policy or policy fragment is cross correlated with path preference policies to ensure that the enforcement location for the policy or policy fragment is appropriately ordered relative to the path preference policies.

Accordingly, the policy fragment "copy traffic from User 1 to App1 and send it to IPS1" would be evaluated first because it is a copy and redirect policy, and therefore, it will be evaluated before the access control policy fragment of "deny traffic from User 1 to App1." This policy fragment is first correlated with resource availability topology information to determine which of devices 115*a-e* have the resources available to implement the policy. Assuming for purposes of this example that all of devices 115*a-e* have sufficient resources to execute the policy fragment, the policy fragment would then be correlated with inspection and logging policies. In this case, there are no policy fragments with inspection requirements. Next, the policy fragment would be correlated with copy/redirect policies. In this case, the policy fragment being evaluated is the only copy and redirect policy. The policy fragment is then correlated with access control policies. As noted above, the other policy fragment resolved from this policy is such an access control policy. The other policy fragment indicates that traffic from User1 to App1 is to be denied. Cross correlating with this policy fragment indicates that the traffic must be copied and sent to IPS1 before the traffic is denied. Finally, the policy fragment is correlated with path preference policies and topology data. According to the present example, IPS1 accesses network domain 110 through device 115c. Therefore, the traffic from User1 to App1 should be copied and sent to IPS1 at a network device along the path from device 115a (the endpoint device associated with User1) and device 115e (the device via which App1 accesses network domain 110), that is prior to network device 115c (the device via which IPS1 accesses network domain 110). Accordingly, the enforcement point selected for this policy fragment would be device 115b. Device 115c would not be selected because traffic from User1 to App1 could circumvent the policy if it travels through device 115d instead of device 115c. Device 115e would not be selected because the copied traffic would then have to back-track to device 115c to get to IPS1. Therefore, device 115b is selected as the enforcement point for this policy fragment.

Next, the second policy fragment "Deny traffic from User 1 to App1" would undergo the same process. This policy fragment would first be correlated with resource availability topology information to determine which of devices 115a-e have the resources available to implement the policy. Assuming for purposes of this example that all of devices 115a-e have sufficient resources to execute the policy fragment, the policy fragment would then be correlated with inspection and logging policies. In this case, there are no policy fragments with inspection and logging requirements. Next, the policy fragment would be correlated with copy/redirect policies. In this case, the previously described policy includes a copy and redirect requirement. Because the present policy fragment is a "deny" policy, it will need to be enforced at a point at or subsequent to this copy/redirect policy. Accordingly, the policy fragment may be enforced at devices 115b-e. Because the policy fragment is to be enforced at or subsequent to where the "copy" policy fragment is enforced, and it is a deny policy which should be enforced as early as possible, device 115b is also selected as the enforcement point for this policy fragment. Devices subsequent to device 115b may also be selected as the enforcement point for the policy fragment. Therefore, device 115e may also be selected as the enforcement point for the policy fragment, though it may result in a less efficient placement of the policy enforcement point. Devices 115c and 115d are also subsequent to device 115b. Yet, because the traffic could travel along either of network paths 135b or 135c, the deny policy cannot be enforced at just one of device 115c and device 115d, and therefore, the policy may be more efficiently enforced at devices 115b and 115e.

Figure 2:
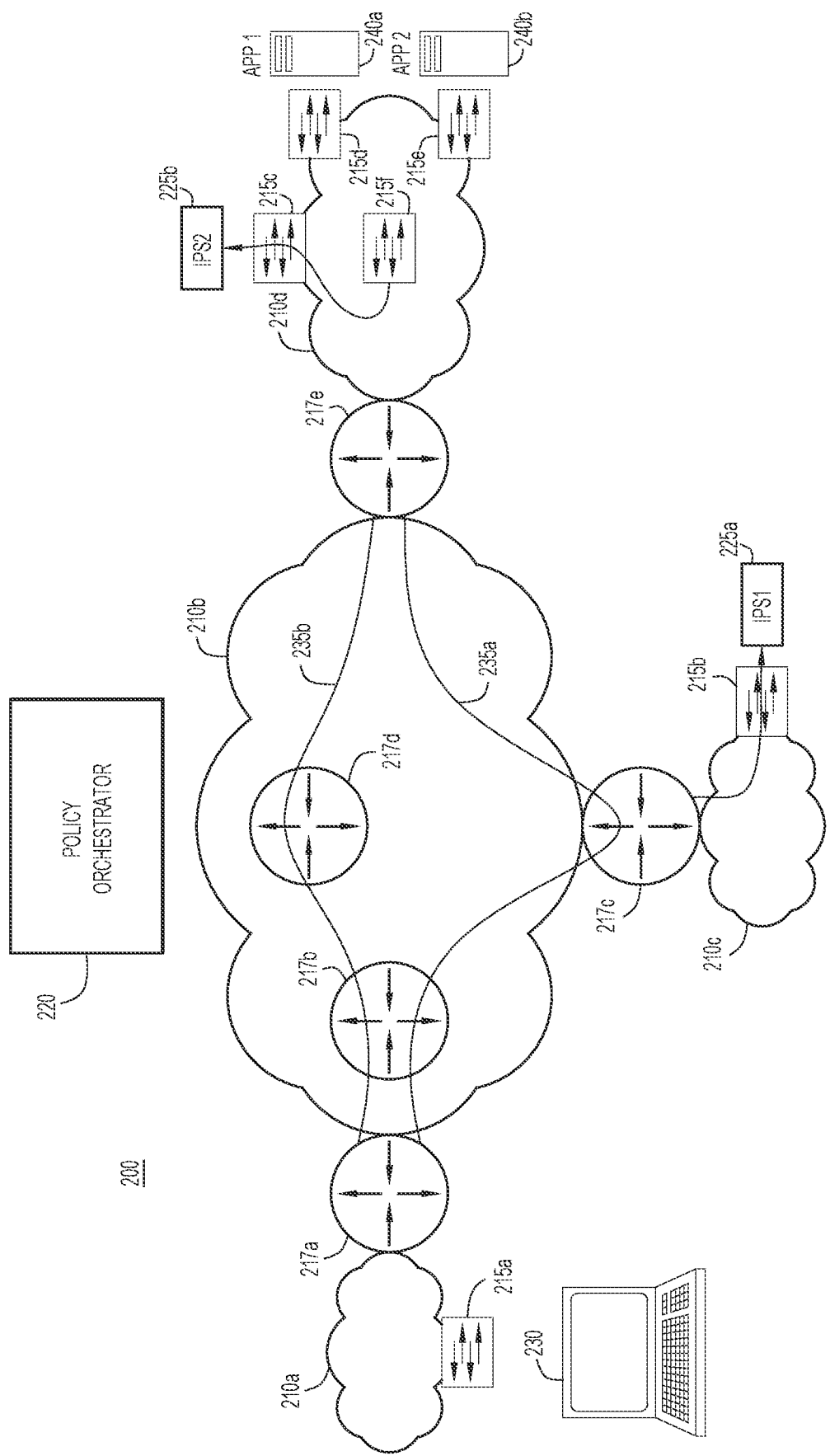
FIG. 2 is a multi-domain network environment configured to implement the policy enforcement point resolution techniques of the present disclosure, according to an example embodiment.

The description above that accompanied FIG. 1 of this disclosure was directed to an example embodiment in which the policy orchestrator 120 determined policy enforcement points for a single network domain 110. Turning to FIG. 2, depicted therein is a network environment 200 in which a policy orchestrator 220 determines enforcement points for network policies in a multi-network domain environment. As illustrated in FIG. 2, network environment 200 includes four network domains 210a-d. Included in the network environment 200 are a plurality of network devices, including switches 215a-f and routers 217a-e. Traversing network domain 210b are two network paths, network path 235a with "gold" level "QoS" and network path 235b with "silver" level QoS. Finally, a number of endpoint devices connect to network environment 200: a user device 230 associated with user "User1" connects to network domain 210a, intrusion prevention systems (IPSs) IPS1 225a and IPS2 225b connect to network domains 210c and 210d, respectively, and application servers 240a and 240b connect to network domain 210d through switches 215d and 215e, respectively.

According to the present example, policy orchestrator 220 contains data indicative of the above-described network topology, and is also configured to determine enforcement points for the following policy:

Copy Policy Section:
  copy traffic from "User1" to "App1" and send the copied traffic to "IPS1"
  copy traffic from "User1" to "App2" and send the copied traffic to "IPS2"
Access-Control Section
  permit traffic from "User1" to "App1"
  deny traffic from "User1" to "App2"
Path Control Section
  Send "App1" traffic with "gold" QoS
  Send all other traffic with "silver" QoS.

According to the techniques of the present disclosure, policy orchestrator 220 will resolve this policy into a plurality of policy fragments, correlate the policy fragments with network topology data and other policies and/or policy fragments, and assign the policy to a device, such as switches 215a-f or routers 217a-e, as an enforcement point. As noted above, the policy fragments may be evaluated in a specific order. For example, the order that may be followed would be: (1) resource availability, (2) inspection and logging, (3) copy/redirect, and (4) access control and path preference.

For purposes of the present disclosure, the policy segment "copy traffic from 'User1' to 'App1' and send to 'IPS1'" may be evaluated first as it is a "copy/redirect" policy and there are no "inspection and logging" policy fragments. This policy would be correlated with network topology data to determine which devices have resources and the capability of implementing the policy. For purposes of this example, it is determined that all of switches 215a-f and routers 217a-e have sufficient resources and capabilities to implement this policy, and that switches 215a-f and routers 217a-e are all configured to be able to implement this policy fragment. Next, this fragment is correlated with other "copy and redirect" policies and policy fragments. The other "copy and redirect" policy fragment of the present example is diverse from this policy fragment (i.e., this policy fragment is for traffic directed to "App1" while the other "copy and redirect" policy fragment is for traffic directed to "App2"), and therefore, the correlation with this policy fragment does not affect policy placement. Next, the policy is correlated with access control policy fragments. The first access control policy fragment, "permit traffic from 'User1' to 'App1,'" is a permit policy that does not need enforcement. Therefore, cross correlation with this policy does not affect the enforcement point of the present policy fragment. The second access control policy fragment, "deny traffic from 'User1' to 'App2,'" is diverse from the present policy, and therefore, cross correlation with this access control policy fragment does not affect the enforcement location of the present policy. Next, the "copy traffic from 'User1' to 'App1' and send to 'IPS1'" is correlated with the first path control policy fragment, "send 'App1' traffic with 'gold' QoS." Cross correlating with this policy indicates that the enforcement of the present policy may be along the network path 235a as this is the network path with "gold" QoS. Finally, the present network policy is diverse from the second path control policy fragment, and therefore, this fragment does not affect the enforcement location of the present policy.

After this evaluation, the determination is made that the "copy traffic from 'User1' to 'App1' and send to 'IPS1'" policy fragment may be enforced at router 217c. Router 217c is arranged along the "gold" QoS network path 235a and it is the device that is closest to IPS1 225a.

A similar evaluation process will be performed for the other policy fragments, which will result in the following enforcement points for the policy fragments:

- The policy fragment "copy traffic from to 'App2' and send to 'IPS2'" will be enforced at switch 215f as it is along the path from "User1" to "App2," it is consistent with the traffic sent with "silver QoS, and this is the enforcement point that will optimize the amount of traffic sent through network environment 200. For example, implementing the policy fragment prior to switch 215f will result in additional network traffic traversing at least network domain 210d. Implementing the policy fragment subsequent to switch 215 at, for example, switch 215e would result in traffic back-tracking through network domain 210d.
- The policy fragment "permit traffic from 'User1' to 'App1'" is a permit policy that does not require a particular enforcement point.
- The policy "deny traffic from 'User1' to 'App2'" is enforced at switch 215e or 215f as it must be enforced subsequent to or at the same device as the enforcement of the "copy traffic from 'User1' to 'App2' and send to 'IPS2'" policy fragment, which is being enforced at switch 215f.
- policy fragment "send 'App1' traffic with 'gold' QoS" is implemented at router 217a. This policy could also be first implemented at router 217b. Furthermore, because QoS is implemented by all devices along the path, the policy may also be implemented by the other devices along path 235a, mainly router 217c.
- The policy fragment "send all other traffic with 'silver' QoS" is similarly implemented at router 217a. This policy could also be first implemented at router 217b. Furthermore, because QoS is implemented by all devices along the path, the policy may also be implemented by the other devices along path 235b, mainly router 217d.

Figure 3:
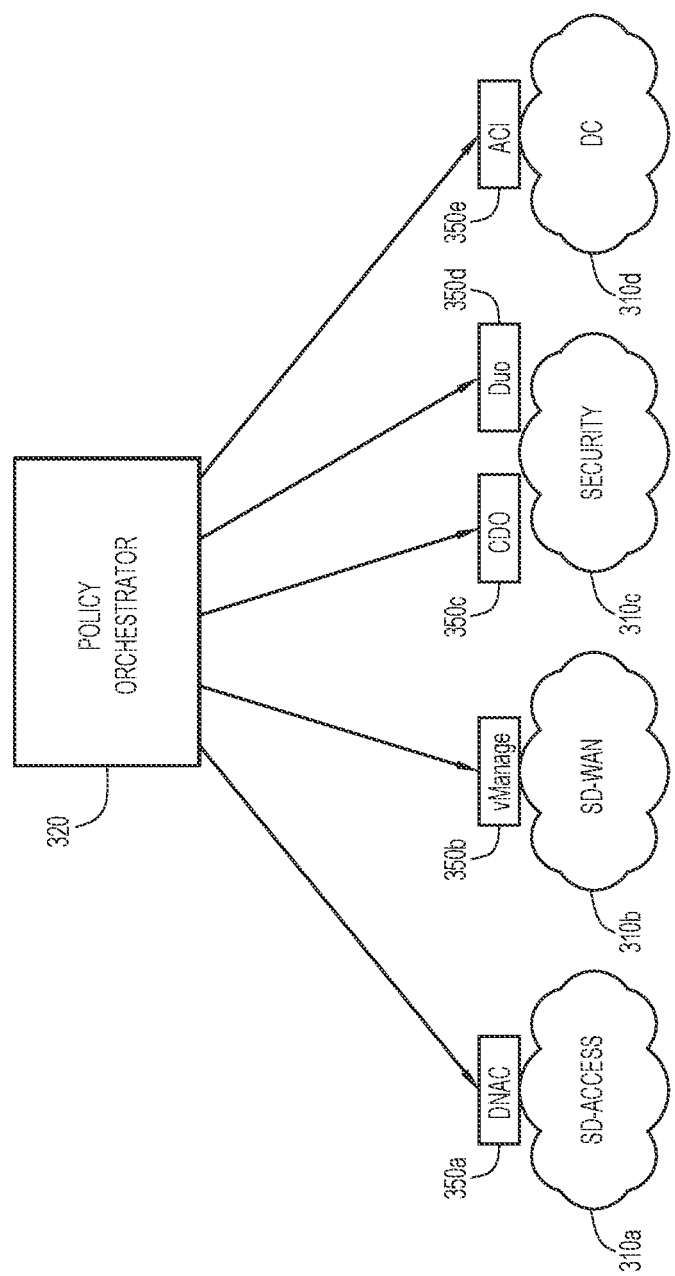
FIG. 3 is a functional diagram illustrating the relationship between a policy orchestrator configured to implement the policy enforcement point resolution techniques of the present disclosure and network domain controllers, according to an example embodiment.

Turning to FIG. 3, depicted therein is a diagram illustrating how policy orchestrator 320 is configured with network topology data that is used in the policy enforcement techniques of the present disclosure. As illustrated in FIG. 3, policy orchestrator 320 receives topology data from the control devices 350a-e (also referred to herein as "domain controllers") associated with network domains 310a-d. For example, if network domain 310a is a software-defined access network domain (SD-Access), control device 350a may be embodied as a Cisco's DNA Center. If network domain 310b is embodied as a software-defined wide area network (SD-WAN), control device 350b may be embodied as Cisco's vManage management and provisioning platform. If network domain 310c is embodied as a security domain, it may be serviced by two control devices 350c and 350d, such as Cisco's Defense Orchestrator (CDO) and Cisco's Duo Network Gateway, respectively. Finally, if network domain 310d is embodied as a data center (DC) network domain, control device 350e may be embodied as an Application Centric Infrastructure (ACI) device. Other control devices may include Domain Name System (DNS) domain controllers. The control devices 350a-e may be configured to provide policy orchestrator 320 with network topology data that allows policy orchestrator 320 to determine policy enforcement points according to the techniques of the present disclosure. For example, control devices 350a-e may advertise their interfaces to neighboring domains. Policy orchestrator 320 may build the multi-domain network topology from these advertisements. Furthermore, policy orchestrator 320 may be configured to communicate policy enforcement point decisions to control devices 350a-e so that the control devices 350a-e may implement the enforcement point decisions in their respective network domains 310a-d.

Figure 4:
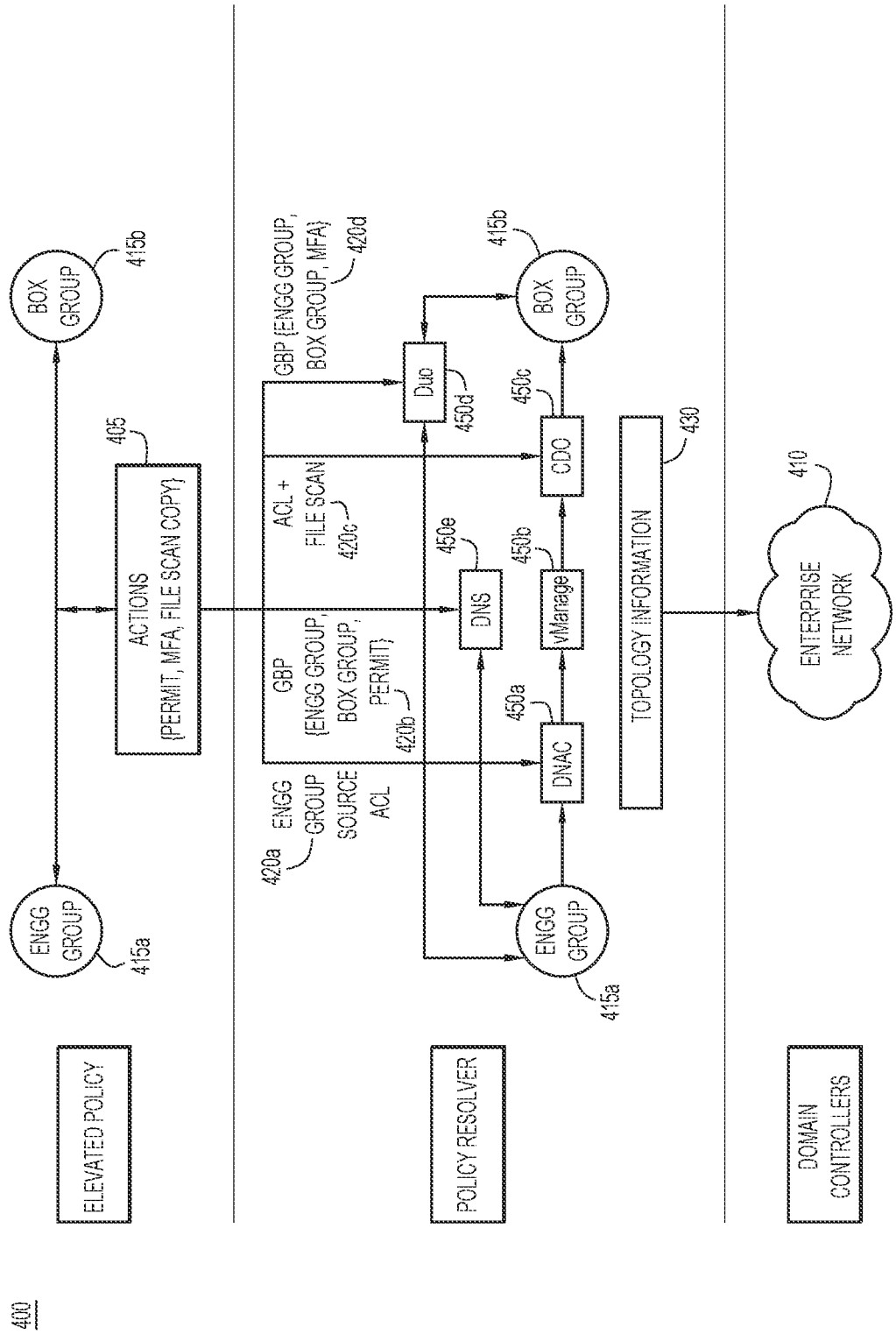
FIG. 4 illustrates a dataflow implementing the policy enforcement point resolution techniques of the present disclosure, according to an example embodiment.

With reference now made to FIG. 4, depicted therein is a data flow 400 for a generic policy enforcement point determination that considers path preference, QoS, access control and other considerations in a multi-domain network environment. The process begins with elevated policy data 405 that implements policy actions between two entities, in this case, an "engineering" user group 415a and a "box" group 415b. The elevated policy may be viewed as the policy that combines one or more actions before the policy is fragmented by a policy orchestrator, like policy orchestrators 120, 220 and 320 of FIGS. 1-3, respectively. The policy orchestrator resolves the elevated policy into policy fragments 420a-d. These policy fragments may include ACL policy fragments 420a and 420c, and group based policy (GBP) policy fragments 420b and 420d. These policy fragments are cross-correlated with network topology information 430 and the other policy fragments to make enforcement point decisions. Once the enforcement point decisions are made, the decisions are passed to the domain controllers 450a-e for the respective network domains in which the policy fragments are to be enforced. Finally, the domain controllers 450a-e implement the enforcement of the policy fragments at the determined locations in enterprise network 410.

Figure 5:
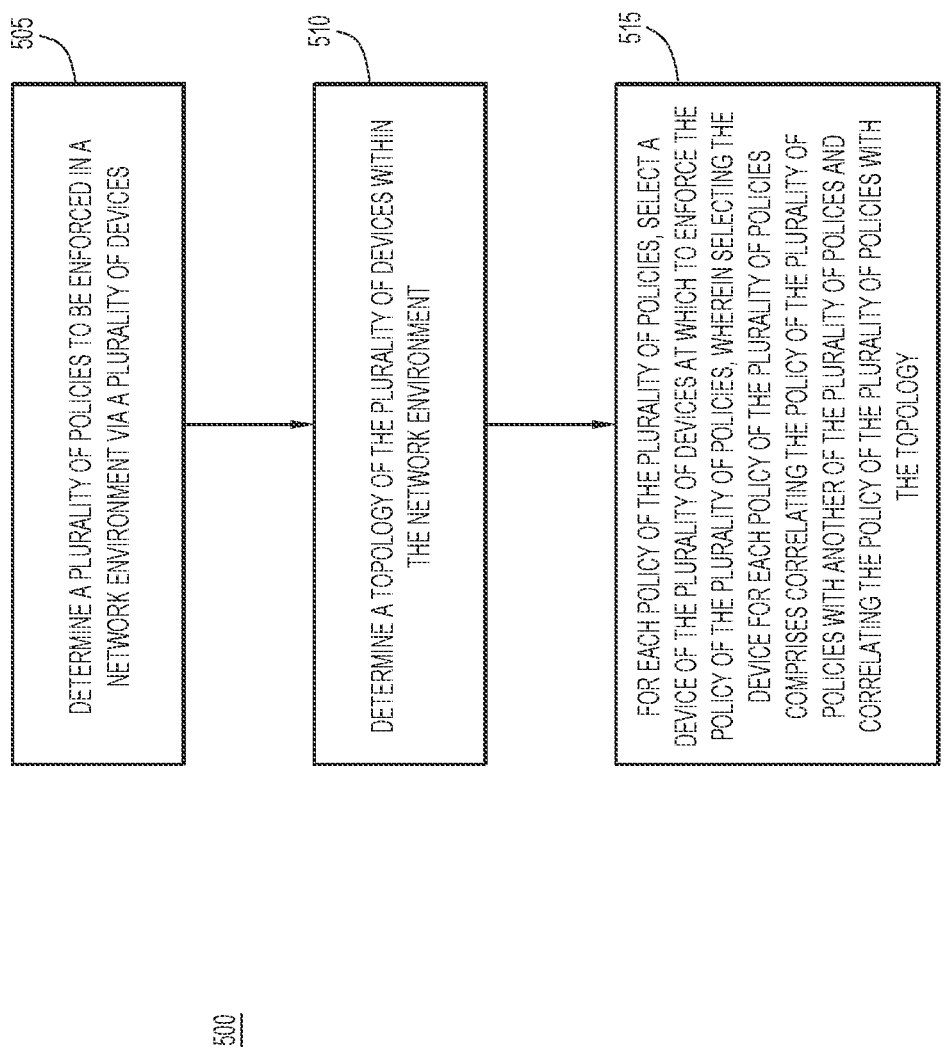
FIG. 5 is a flowchart illustrating a process flow for implementing the policy enforcement point resolution techniques of the present disclosure, according to an example embodiment.

With reference now made to FIG. 5, depicted therein is a flowchart 500 providing a process flow according to the techniques of the present disclosure. The process of flowchart 500 begins in operation 505 in which a plurality of policies are determined. The plurality of policies are to be implemented or enforced in a network environment by a plurality of network devices. The network policies may be user defined or automatically determined by, for example, a policy orchestrator like policy orchestrators 120, 220 and 320 of FIGS. 1-3. The determination of the policies of operation 505 may also include resolving a policy, such as an elevated policy, into a plurality of policy fragments. The network environment referenced in operation 505 may be embodied as a single network domain network environment or a multi-domain network environment.

In operation 510, a topology of the plurality of devices within the network environment is determined. For example, the determination of the topology may be embodied as a policy orchestrator receiving topology data from one or more network domain controllers. The topology may be comprised of data that indicates the arrangement of the plurality of devices within the network environment, the policy implementation capabilities of the devices in the network environment, the resources of the plurality of devices within the network environment (e.g., CPU resources, memory resources, TCAM resources), the locations of the network links between the plurality of devices, the bandwidth capacities of the links, and others known to the skilled artisan.

In operation 515, a device of the plurality of devices is selected for the enforcement of each of the plurality of policies in the network environment. The selection of the device for each of the plurality of policies includes correlating the policy with another of the policies and correlating the policy with the topology. For example, the selection of the device for implementation of the policy may be carried out according to the techniques described above with reference to FIGS. 1-4. Accordingly, the correlation of the policy with the plurality of policies may include correlating a policy fragment with other policy fragments, or correlating a policy fragment with network topology data.

The process of flowchart 500 may also include policy consistency checks to ensure that the determined enforcement points result in policy consistency. Furthermore, the above-described evaluation of the policies may ensure that the evaluation leads to not just the optimal enforcement location, but also the honoring of the different policies.

Figure 6:
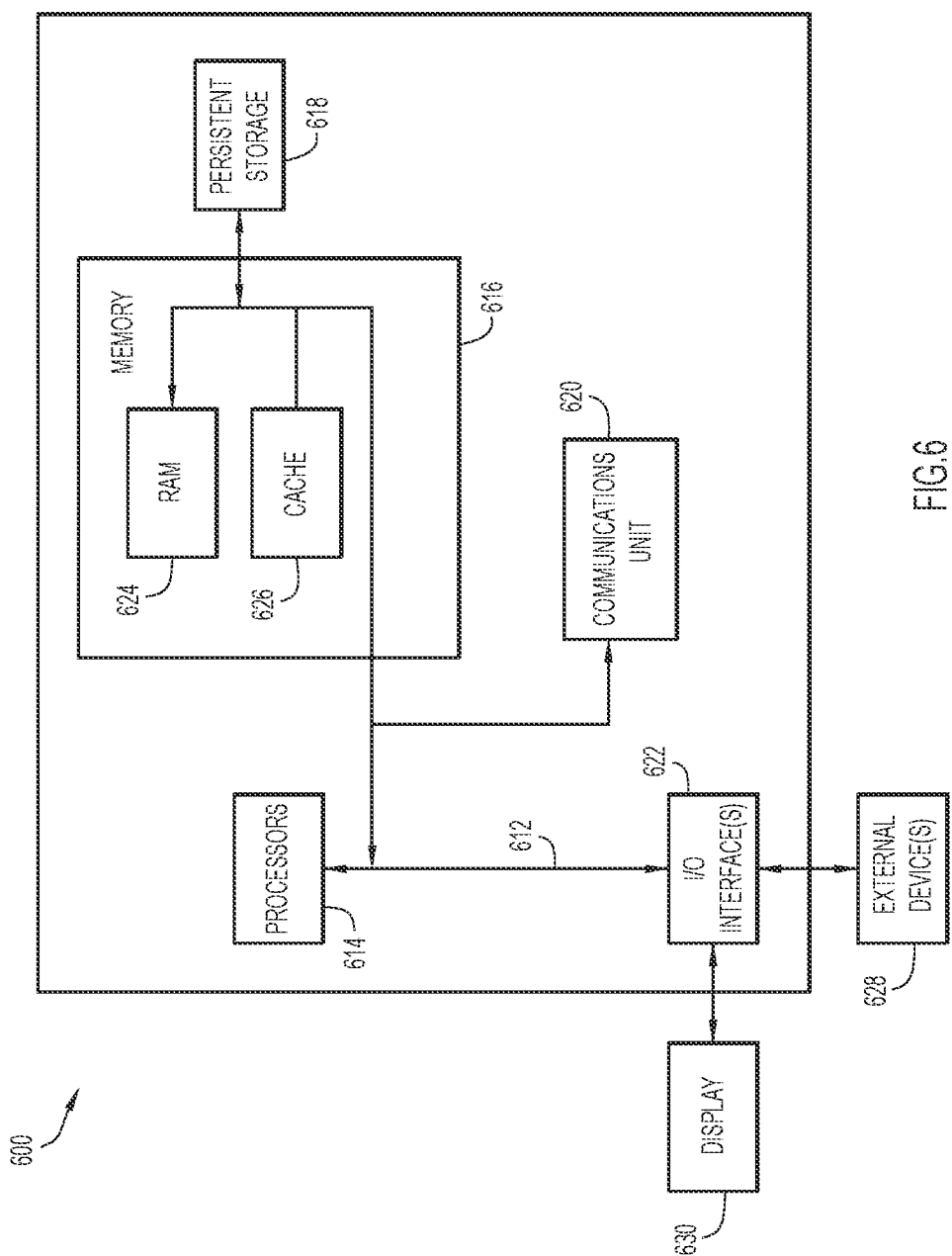
FIG. 6 is a block diagram of a device configured to implement the policy enforcement point resolution techniques of the present disclosure, according to an example embodiment.

With reference now made to FIG. 6, illustrated therein is a hardware block diagram of an example device 600 (e.g., a computing device (such as a server) that performs the operations of the devices disclosed herein. For example, device 600 may be embodied as a policy orchestrator, such as policy orchestrators 120, 220 or 320 of FIGS. 1-3. Device 600 may also be embodied as one more of switches, routers or domain controllers, as illustrated in FIGS. 1-4. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and Input/Output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes Random Access Memory (RAM) 624 and cache memory 626. In general, memory 616 can include any suitable volatile or non-volatile computer readable storage media. Instructions to implement the techniques of the present disclosure may be stored in memory 616 or persistent storage 618 for execution by computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface(s) 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration.

The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer programs products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, fragment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, provided for herein are methods, devices and apparatuses, and computer readable media that resolve policies, correlate within different sections of the policy (e.g., access control, path preference and copy), and correlate with network topology to determine optimal enforcement points in single and multi-domain networks.

The present disclosure provides for methods that include the operations of determining a plurality of policies to be enforced in a network environment via a plurality of devices; determining a topology of the plurality of devices within the network environment; and selecting, for each policy of the plurality of policies, a device of the plurality of devices at which to enforce the policy of the plurality of policies, wherein selecting the device for each policy of the plurality of policies comprises correlating the policy of the plurality of policies with another of the plurality of policies and correlating the policy of the plurality of policies with the topology.

Also provided for herein are apparatuses that include one or more network interfaces and one or more processors. The one or more processors are configured to: determine a plurality of policies to be enforced in a network environment via a plurality of devices; receive, via the one or more network interfaces, data indicative of locations of the plurality of devices within the network environment; determine a topology of the plurality of devices within the network environment from the data indicative of locations of the plurality of devices within the network environment; and select, for each policy of the plurality of policies, a device of the plurality of devices at which to enforce the policy of the plurality of policies, wherein selecting the device for each policy of the plurality of policies comprises correlating the policy of the plurality of policies with another of the plurality of policies and correlating the policy of the plurality of policies with the topology.

The techniques of the present disclosure also provide for one or more non-transitory computer readable storage media encoded with instructions. The instructions, when executed by a processor, cause the processor to: determine a plurality of policies to be enforced in a network environment via a plurality of devices; determine a topology of the plurality of devices within the network environment; and select, for each policy of the plurality of policies, a device of the plurality of devices at which to enforce the policy of the plurality of policies, wherein selecting the device for each policy of the plurality of policies comprises correlating the policy of the plurality of policies with another of the plurality of policies and correlating the policy of the plurality of policies with the topology.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining a plurality of policies to be enforced in a network environment via a plurality of devices along a traversal path through the network environment;
   determining a topology of the plurality of devices within the network environment; and
   selecting, for each policy of the plurality of policies, a device of the plurality of devices at which to enforce the policy of the plurality of policies, by:
   correlating the policy of the plurality of policies with another of the plurality of policies,
   correlating the policy of the plurality of policies with the topology,
   determining an order of enforcement of the plurality of policies, and
   selecting the device for each policy based on the order of enforcement and a location of the device within the topology such that the traversal path through the topology results in enforcement in the determined order.

2. The method of claim 1, wherein determining the plurality of policies comprises resolving a policy into a plurality of policy fragments; and wherein correlating the policy of the plurality of policies with another of the plurality of policies comprises correlating a policy fragment of the plurality of policy fragments with another of the plurality of policy fragments.

3. The method of claim 1, wherein determining the topology comprises determining the topology for a plurality of network domains.

4. The method of claim 1, wherein selecting, for each policy of the plurality of policies, the device of the plurality of devices at which to enforce the policy of the plurality of policies comprises selecting the device of the plurality of devices for each of the plurality of policies in a predetermined order based upon types of policies.

5. The method of claim 4, wherein the predetermined order comprises the following ordered list of types of policies:
   inspection and logging policies,
   copy/redirect policies,
   access control policies, and
   path preference policies.

6. The method of claim 1, wherein correlating the policy of the plurality of policies with the topology comprises correlating the policy of the plurality of policies with resources of the plurality of devices.

7. The method of claim 6, wherein the resources of the plurality of devices comprise one or more of the following:
   ternary content-addressable memory resources,
   central processing unit resources, and
   memory resources.

8. The method of claim 1, wherein correlating the policy of the plurality of policies with the topology comprises correlating the policy of the plurality of policies with policy implementation capabilities of the plurality of devices.

9. One or more non-transitory computer readable storage media encoded with instructions that, when executed by a processor, cause the processor to:
   determine a plurality of policies to be enforced in a network environment via a plurality of devices along a traversal path through the network environment;
   determine a topology of the plurality of devices within the network environment; and
   select, for each policy of the plurality of policies, a device of the plurality of devices at which to enforce the policy of the plurality of policies, by:
      correlating the policy of the plurality of policies with another of the plurality of policies,
      correlating the policy of the plurality of policies with the topology,
      determining an order of enforcement of the plurality of policies, and
      selecting the device for each policy based on the order of enforcement and a location of the device within the topology such that the traversal path through the topology results in enforcement in the determined order.

10. The one or more non-transitory computer readable storage media of claim 9, wherein the instructions that cause the processor to determine the plurality of policies further cause the processor to resolve a policy into a plurality of policy fragments; and wherein the instructions that cause the processor to correlate the policy of the plurality of policies with another of the plurality of policies cause the processor to correlate a policy fragment of the plurality of policy fragments with another of the plurality of policy fragments.

11. The one or more non-transitory computer readable storage media of claim 9, wherein the instructions that cause the processor to determine the topology further cause the processor to determine the topology for a plurality of network domains.

12. The one or more non-transitory computer readable storage media of claim 9, wherein the instructions that cause the processor to select, for each policy of the plurality of policies, the device of the plurality of devices at which to enforce the policy of the plurality of policies further cause the processor to select the device of the plurality of devices for each of the plurality of policies in a predetermined order based upon types of policies.

13. The one or more non-transitory computer readable storage media of claim 12, wherein the predetermined order comprises the following ordered list of types of policies:
   inspection and logging policies,
   copy/redirect policies,
   access control policies, and
   path preference policies.

14. An apparatus comprising:
   one or more network interfaces; and
   one or more processors, wherein the one or more processors are configured to:
      determine a plurality of policies to be enforced in a network environment via a plurality of devices along a traversal path through the network environment;
      receive, via the one or more network interfaces, data indicative of locations of the plurality of devices within the network environment;
      determine a topology of the plurality of devices within the network environment from the data indicative of locations of the plurality of devices within the network environment; and
      select, for each policy of the plurality of policies, a device of the plurality of devices at which to enforce the policy of the plurality of policies, by:
         correlating the policy of the plurality of policies with another of the plurality of policies,
         correlating the policy of the plurality of policies with the topology,
         determining an order of enforcement of the plurality of policies, and
         selecting the device for each policy based on the order of enforcement and a location of the device within the topology such that the traversal path through the topology results in enforcement in the determined order.

15. The apparatus of claim 14, wherein the one or more processors are configured to determine the plurality of policies by resolving a policy into a plurality of policy fragments; and wherein the one or more processors are configured to correlate the policy of the plurality of policies with another of the plurality of policies by correlating a policy fragment of the plurality of policy fragments with another of the plurality of policy fragments.

16. The apparatus of claim 14, wherein the one or more processors are configured to determine the topology by determining the topology for a plurality of network domains.

17. The apparatus of claim 14, wherein the one or more processors are configured to select, for each policy of the plurality of policies, the device of the plurality of devices at which to enforce the policy of the plurality of policies by selecting the device of the plurality of devices for each of the plurality of policies in a predetermined order based upon types of policies.

18. The apparatus of claim 17, wherein the predetermined order comprises the following ordered list of types of policies:
- inspection and logging policies,
- copy/redirect policies,
- access control policies, and
- path preference policies.

19. The apparatus of claim 14, wherein the one or more processors are configured to correlate the policy of the plurality of policies with the topology by correlating the policy of the plurality of policies with resources of the plurality of devices.

20. The apparatus of claim 19, wherein the resources of the plurality of devices comprise one or more of the following:
- ternary content-addressable memory resources,
- central processing unit resources, and
- memory resources.

\* \* \* \* \*